United States Patent
Doi et al.

(10) Patent No.: US 7,764,599 B2
(45) Date of Patent: Jul. 27, 2010

(54) NETWORK ROUTING DEVICE AND NETWORK ROUTING METHOD

(75) Inventors: Toshio Doi, Kodaira (JP); Yukimasa Komahara, Hadano (JP)

(73) Assignee: ALAXALA Networks Corporation, Kanagawa (JP)

(*) Notice: Subject to any disclaimer, the term of this patent is extended or adjusted under 35 U.S.C. 154(b) by 566 days.

(21) Appl. No.: 11/672,152

(22) Filed: Feb. 7, 2007

(65) Prior Publication Data
US 2007/0280100 A1    Dec. 6, 2007

(30) Foreign Application Priority Data
Jun. 1, 2006    (JP)    ............... 2006-153375

(51) Int. Cl.
*G01R 31/08*    (2006.01)
(52) U.S. Cl. ................ 370/217; 370/216; 370/351; 714/1; 714/48
(58) Field of Classification Search ................ 370/216, 370/217, 254, 351, 389, 392; 714/100, 1, 714/48, 55, 56
See application file for complete search history.

(56) References Cited

U.S. PATENT DOCUMENTS

| 2005/0076231 A1* | 4/2005 | Ichinohe et al. ............. 713/200 |
| 2006/0072480 A1* | 4/2006 | Deval et al. ................. 370/254 |
| 2009/0067331 A1* | 3/2009 | Watsen et al. ............... 370/235 |

FOREIGN PATENT DOCUMENTS

JP    06-261078    9/1994

OTHER PUBLICATIONS

Request for Comments (RFC) 3871.

* cited by examiner

*Primary Examiner*—Chi H Pham
*Assistant Examiner*—Weibin Huang
(74) *Attorney, Agent, or Firm*—Antonelli, Terry, Stout & Kraus, LLP.

(57) ABSTRACT

A network routing device according to the invention transmits a packet via a second port based upon destination information included in the packet received via a first port referring to a routing table. In addition, the network routing device calculates beforehand a third port which is a transfer destination when a fault occurs in a destination connected to the second port. Further, the network routing device holds scenario information including a combination of the second port and the third port and updates the routing table based upon the scenario information when a fault is detected in either of the ports.

2 Claims, 5 Drawing Sheets

SCENARIO INFORMATION DATABASE (320)

| EVENT (3210) | ACTION (3220) | | |
|---|---|---|---|
| | OPERATION (3221) | CHANGED OBJECT (3222) | CHANGED DATA (3223) |
| P31 | CHANGE TO NEXT HOP | R31 | R11 |
| ⋮ | ⋮ | ⋮ | ⋮ |

NETWORK ROUTING DEVICE AND NETWORK ROUTING METHOD

INCORPORATION BY REFERENCE

The present application claims priority from Japanese patent application serial no. 2006-153375, filed on Jun. 1, 2006, the content of which is hereby incorporated by reference into this application.

BACKGROUND OF THE INVENTION

1. Field of the Invention

The present invention relates to a network routing device and a network routing method, detailedly relates to the network routing device and the network routing method where path switching performance is enhanced.

2. Description of the Related Art

In the operation of a router in a recent large-scale network, the detection of a fault on line and the reduction of time required until the recovery of the fault are indispensable.

In JP-A No. 261078/1994, a router that enables the high-speed retrieval of a routing table is described.

In addition, in a document (RFC3871)(G. Jones, "Operational Security Requirements for Large Internet Service Provider (ISP) IP Network Infrastructure", IETF, the Internet <URL: http://www.ietf.org/rfc/rfc3871.txt?number=3871>), a router is described which is divided into a control plane and a forwarding plane and in which the control plane calculates a routing protocol and the forwarding plane relays data.

SUMMARY OF THE INVENTION

As for the detection of a fault on line, bidirectional forwarding detection (BFD) and others are proposed. However, technique for greatly enhancing path switching performance required to reduce time for recovering from the fault cannot be found. In the above-mentioned two documents, the technique for greatly enhancing the path switching performance is not described, either.

According to the invention, a network routing device and a network routing method where a period from the occurrence of a fault to the recovery of the fault is short can be provided.

The above-mentioned problem can be settled by the network routing device characterized in that a packet is transmitted via a second port based upon destination information included in the packet received via a first port referring to a routing table, a third port which is a transfer destination when a fault occurs in a destination connected to the second port is calculated beforehand, scenario information including a combination of the second port and the third port is held and the routing table is updated based upon the scenario information when a fault is detected in either of the ports.

In addition, the problem can be settled by the network routing device characterized in that the network routing device is configured by a control plane that executes a routing protocol calculating process and a forwarding plane that connects a first port, a second port and a third port and relays a packet among a plurality of ports referring to a routing table, the control plane calculates a transfer destination when a fault occurs in an output destination of the plurality of ports and the forwarding plane holds scenario information including a relation calculated by the control plane between the port where the fault occurs and a transfer port.

Further, the problem can be settled by the network routing method including a step of referring to the routing table based upon destination information included in a packet received via the first port, a step of calculating the third port which is a transfer destination when a fault occurs in a destination connected to the second port beforehand, a step of holding scenario information including a combination of the second port and the third port and a step of updating the routing table based upon the scenario information when a fault is detected in either of the ports.

DETAILED DESCRIPTION OF THE INVENTION

Figure 1:
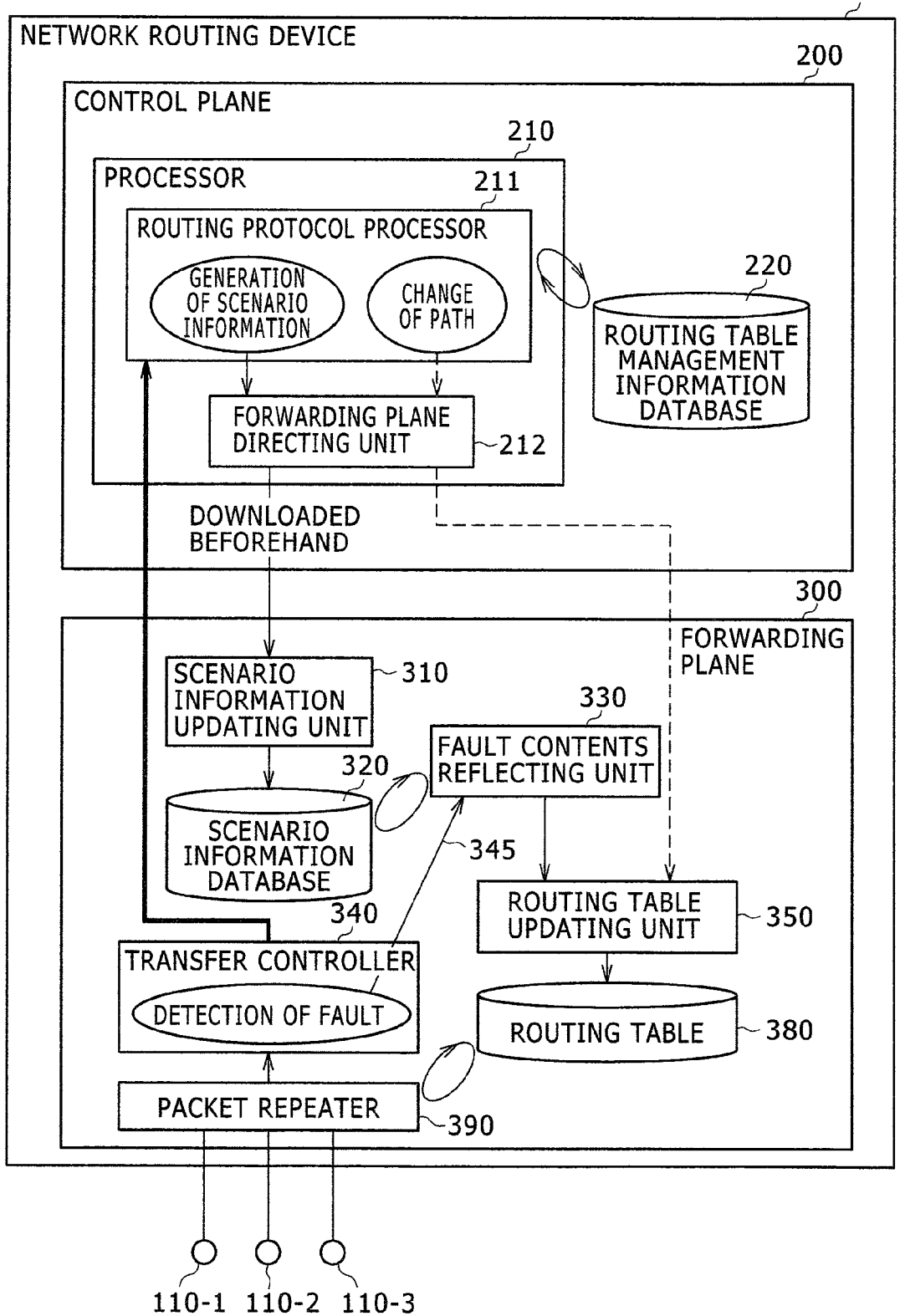
FIG. 1 is a block diagram showing a network routing device.

Referring to the drawings, an embodiment of the invention will be described below. The same reference numeral is allocated to the substantial same part and the description is not repeated.

Figure 2:
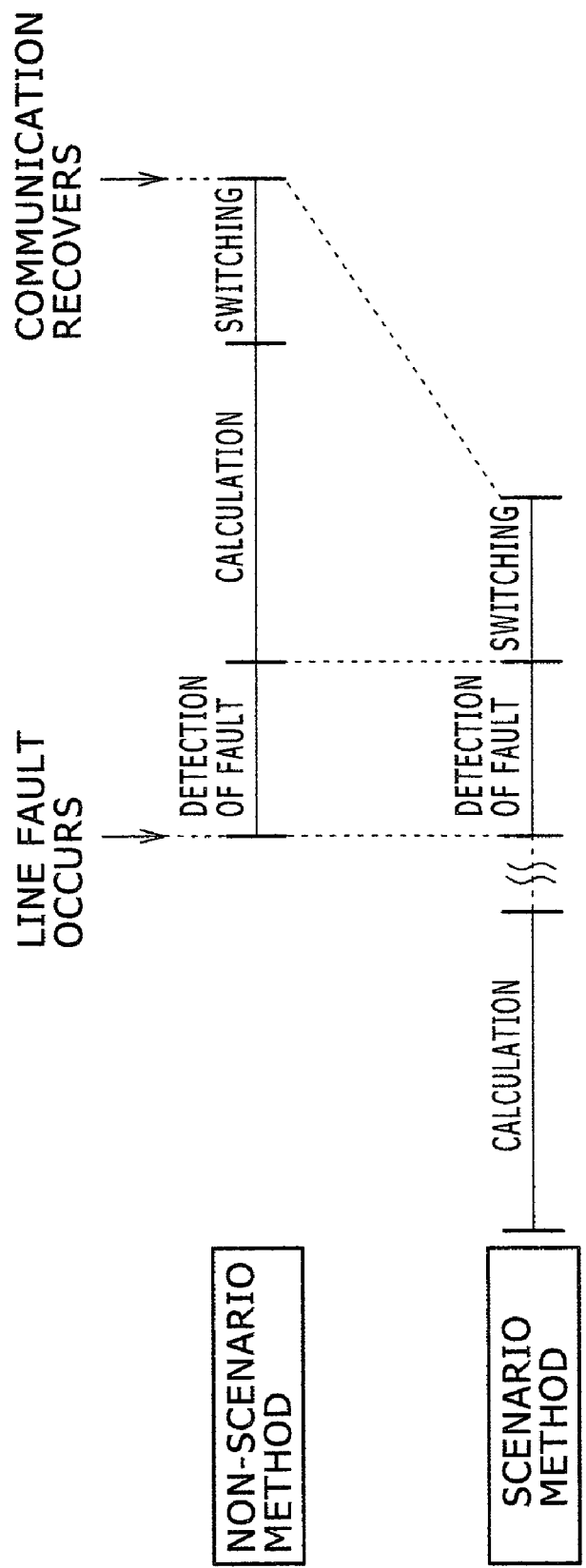
FIG. 2 is an explanatory drawing for explaining time from the occurrence of a fault to the recovery of communication.
Figure 3:
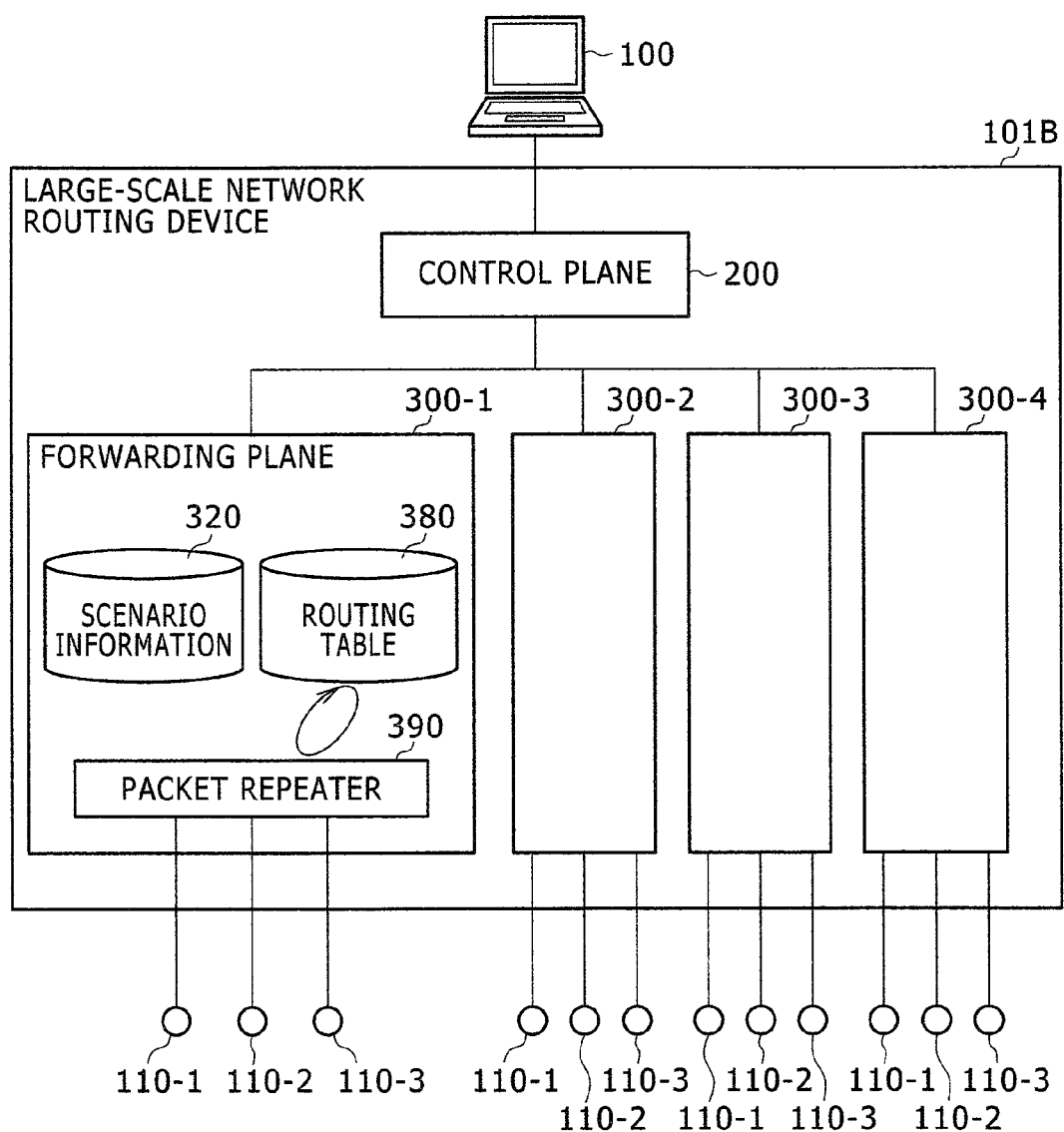
FIG. 3 is a block diagram showing a large-scale network routing system.
Figure 4:
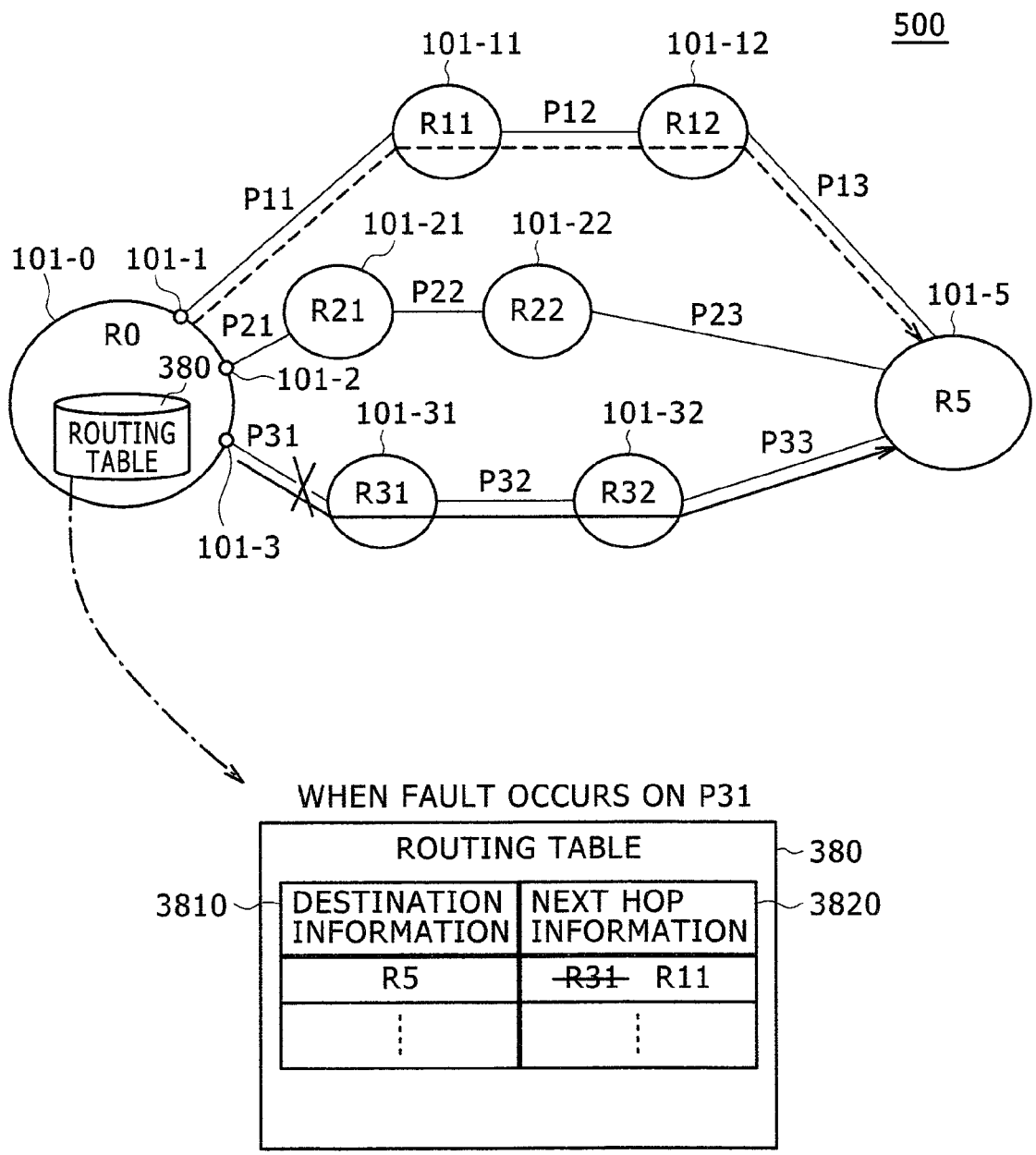
FIG. 4 is a block diagram showing a network of routing devices.
Figures 5, 6:
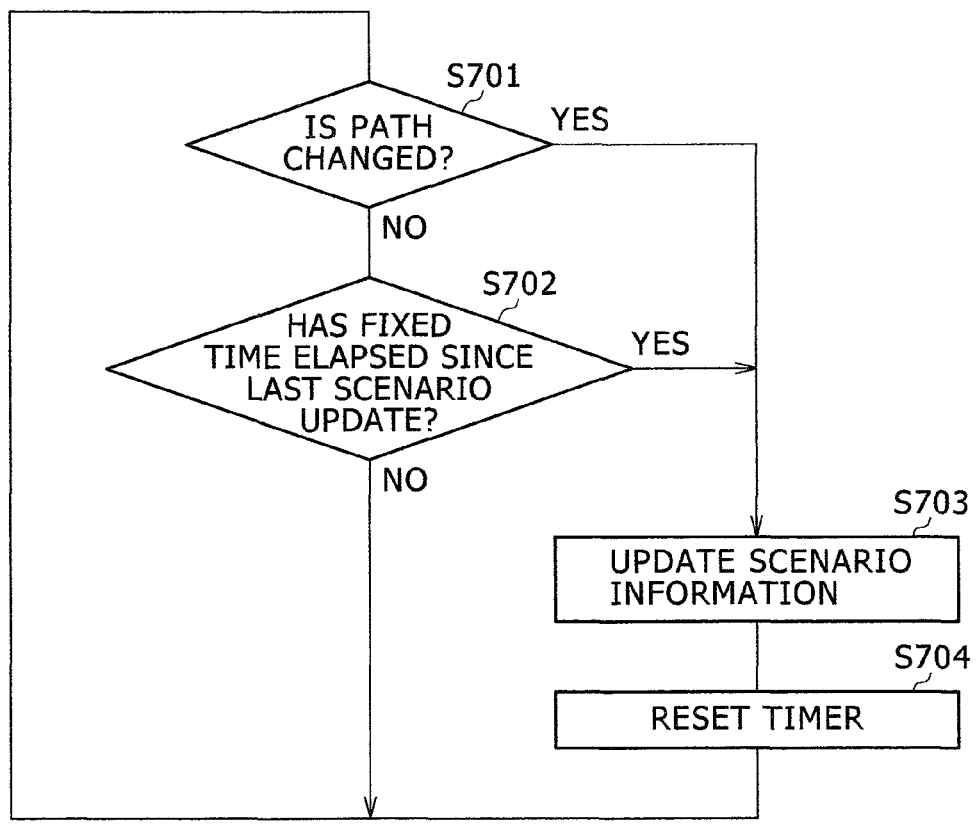
FIG. 5 is an explanatory drawing for explaining a scenario information database.
FIG. 6 is a flowchart for explaining the update of scenario information.

Referring to FIGS. 1 to 7, the embodiment will be described below. FIG. 1 is a block diagram showing a network routing device. FIG. 2 is an explanatory drawing for explaining time from the occurrence of a fault to the recovery of communication. FIG. 3 is a block diagram showing a large-scale network routing system. FIG. 4 is a block diagram showing a network of routing devices. FIG. 5 is an explanatory drawing for explaining a scenario information database. FIG. 6 is a flowchart for explaining the update of scenario information.

As shown in FIG. 1, the network routing device 101A is configured by a control plane 200 including a processor 210 and a forwarding plane 300 including a packet repeater 390. The control plane 200 includes the processor 210 and a routing table management information database 220. Further, the processor 210 is configured by a routing protocol processor 211 and a forwarding plane directing unit 212. The forwarding plane 300 includes a scenario information updating unit 310 that receives a direction transmitted from the forwarding plane directing unit, a scenario information database 320, the packet repeater 390 that connects plural ports 310, a transfer controller 340 that monitors a packet from the packet repeater 390, a fault contents reflecting unit 330 that updates a routing table based upon the fault detected by the transfer controller 340, a routing table updating unit 350 that updates a routing table 380 based upon the direction from the fault contents reflecting unit 330 and the routing table 380.

The control plane 200 manages routing information intensively. The routing protocol processor 211 calculates a routing protocol when a path is changed. The routing protocol processor 211 updates the routing table management information database 220 based upon a result of calculating the routing protocol. The routing protocol processor 211 also updates the routing table 380 based upon the result of calculating the routing protocol via the forwarding plane directing unit 212 and the routing table updating unit 350.

The packet repeater 390 of the forwarding plane 300 retrieves the routing table 380 using destination information included in a header of a received packet as a key when the packet repeater 390 receives the packet from a port 110-1 and transmits the packet from a port 110-2 or a port 110-3 equivalent to a next hop corresponding to the destination information.

The routing protocol processor 211 operates a spare path on the assumption that a fault may occur on a path (the current path) connected to the port 110. The combination of the current path and the corresponding spare path is called a scenario. Plural scenarios are called scenario information. The scenario information is registered in the scenario information database 320 via the forwarding plane directing unit 212 and the scenario information updating unit 310. When a path is changed, the scenario information database 320 is also updated.

When the transfer controller 340 of the forwarding plane 300 detects a fault for reasons that no carrier wave is transmitted and that a BFD packet for a checkup is not transmitted for a predetermined period and so on, the transfer controller 340 informs the routing protocol processor 211 of the control plane 200 that the fault has occurred. The transfer controller 340 also informs the fault contents reflecting unit 330 that the fault has occurred. The fault contents reflecting unit 330 calls the spare path corresponding to the current path on which the fault has occurred referring to the scenario information database 320. The fault contents reflecting unit 330 updates the routing table 380 using the spare path via the routing table updating unit 350. When the routing protocol processor 211 of the control plane 200 receives notice that the fault has occurred, it calculates a routing protocol. The routing protocol processor 211 updates the routing table management information database 220 based upon the result of calculating the routing protocol. The routing protocol processor 211 also updates the routing table 380 based upon the result of calculating the routing protocol via the forwarding plane directing unit 212 and the routing table updating unit 350. As the update of the routing table 380 is already executed based upon the scenario, the latter processing may also be omitted. In place of the BFD packet for a checkup, a hello packet for a checkup may also be used.

Referring to FIG. 2, the effect of a scenario method will be described below. An axis of an abscissa in FIG. 2 shows the elapse of time and FIG. 2 shows a non-scenario method and the scenario method by contrast. In the non-scenario method, after a line fault occurs, three steps of detecting the fault, calculating a path and switching paths are required. In the meantime, in the scenario method, as the path is already calculated on the assumption that a line fault may occur before the line fault occurs, only two steps of detecting the fault and switching paths are required after the line fault has occurred. That is, in the scenario method, compared with the non-scenario method, time from the occurrence of the line fault to the recovery of communication can be reduced if only a scenario is prepared.

Referring to FIG. 3, a large-scale network routing device will be described below. In the network routing device 101A shown in FIG. 1, the control plane 200 and the forwarding plane 300 correspond by one to one. In the meantime, in the large-scale network routing device 101B shown in FIG. 3, one control plane 200 and four forwarding planes 300 correspond. Needless to say, one control plane and N (2 or a larger integer) forwarding planes may also correspond. Each hardware configuration of the control plane 200 and the forwarding planes 300 shown in FIG. 3 is the same as that shown in FIG. 1.

FIG. 3 is different from FIG. 1 in that a controller 100 is connected to the control plane 200 of the large-scale network routing device 101B. However, conversely, the controller 100 may also be connected to the control plane 200 of the network routing device 101A. The substantially same information is stored in the routing table management information database 220 of the control plane 200 in the network routing device 101A and the routing table 380 of the forwarding plane 300. In the meantime, the routing table management information database 220 of the control plane 200 of the large-scale network routing device 101B includes all information in the routing tables 380 of all forwarding planes 300 under the control plane, while the routing table 380 of the individual forwarding planes 300-1 to 300-4 includes only the information of the individual forwarding plane. Similarly, a scenario information database 320 of the individual forwarding plane 300-1 to 300-4 includes only the information of the individual forwarding plane.

In this embodiment, plural forwarding planes are connected to one control plane. This means that when one line fault occurs, one control plane receives plural notices of the fault from the plural forwarding planes. In the non-scenario method, time required until the recovery of communication is added to a load of time for calculating a path on the control plane. In the meantime, the scenario method has effect that the performance of a response is not deteriorated because a scenario is distributed to the plural forwarding planes.

It is preferable that a scenario is distributed to the plural forwarding planes as described above. However, the scenario may also be collectively stored in the control plane. The reason is that the calculation of a path is not required and the table is merely referred.

Referring to FIG. 4, the operation of the network routing device will be described below. In a network 500 shown in FIG. 4, communication is made from a network routing device 101-0 at the left end to a network routing device 101-5 at the right end. A unique number denoted by "R" and a numeral is allocated to each encircled network routing device 101. A unique number denoted by "P" and a numeral is also allocated to a path shown by a straight line connecting the certain network routing device 101 with another network routing device 101. The operation of the network routing device will be described using these unique numbers below. A routing table 380 of R0 is enlarged at the end of an arrow shown by an alternate long and short dash line.

Communication from R0 to R5 is currently made via a path through R31 and R32 and shown by an arrow in a full line. At this time, suppose that a fault has occurred on P31 between R0 and R31. When no packet for a checkup from R31 reaches for a fixed period, R0 detects a fault of R31 or on P31. R0 identifies this fault as a fault on P31 and refers to scenario information. Since it is described in the scenario information described later using FIG. 5 that when the fault occurs on P31, a next hop is changed from R31 to R11, the routing table 380 is referred to and R11 is written in place of R31 written to a next hop information field 3820 of a record having R5 in a destination information field 3810. Concretely, R0 changes a transmission destination port from a port 101-3 to a port 101-1. As a result, communication from R0 to R5 is made via a spare path through R11 and R12 and shown by an arrow in a broken line.

Referring to FIG. 5, the scenario information database will be described below. As shown in FIG. 5, the scenario information database 320 is configured by an event field 3210 and an action field 3220. The action field 3220 includes an operation field 3221, a changed object field 3222 and a changed data field 3223. In the event field 3210, a unique number of a supposed fault occurrence path is written. In the operation field 3221, operation in the routing table 380 is written. In the changed object field 3222, data before a change in the routing table 380 is written. Further, in the changed data field 3223, data after the change in the routing table 380 is written.

A record having P31 in the event field 3210 is the scenario used in the description related to FIG. 4. Concretely, the fault contents reflecting unit 330 notified that the fault occurs on P31 controls the routing table updating unit 350 so that all "R31" are all rewritten to "R11" when "R31" corresponding to "P31" is written in a next hop field of the routing table.

When a fault unwritten in the scenario information database occurs, the update of the routing table by the routing protocol processor of the control plane is awaited.

Referring to FIG. 6, the updating timing of scenario information will be described below. FIG. 6 is a flowchart executed by the routing protocol processor 211. The routing protocol processor 211 always monitors whether a path is changed or not and whether a predetermined period elapses or not. When the routing protocol processor judges that the path is changed (S701), control is returned to the step 701 after the step proceeds to a scenario information updating process in a step 703 and a timer is reset (S704). When it is judged in the step 701 that the path is unchanged, the step proceeds to a step 702 and it is determined whether or not a fixed period elapses since the last update of a scenario (S702). If it is determined in the step 702 that the fixed period elapses (YES), the step proceeds to the step 703. If it is determined in the step 702 that the fixed period does not elapse (NO), the step 702 proceeds to the step 701.

According to this embodiment, as a routing protocol is distributed in the network routing device, path switching performance can be greatly enhanced.

In addition, according to the network routing device equivalent to this embodiment, as a scenario for coping with the occurrence of a fault is prepared beforehand, the path switching performance can be enhanced.

The invention claimed is:

1. A network routing device, comprising a control plane that executes a routing protocol calculating process and a plurality of forwarding planes that connect a first port, a second port and a third port, and that relays a packet among said plurality of ports by referring to a routing table,
   wherein said control plane calculates a transfer destination to be used when a fault occurs in communication between either of said plurality of ports and an output destination;
   wherein said forwarding planes store scenario information including a relation calculated by said control plane between the port where the fault occurs and a transfer port; and
   wherein said scenario information stored by each of said plurality of forwarding planes is respectively different.

2. A network routing device, comprising a control plane that executes a routing protocol calculating process and a plurality of forwarding planes that connect a first port, a second port and a third port, and that relays a packet among said plurality of ports by referring to a routing table,
   wherein said control plane calculates a transfer destination when a fault occurs in communication between either of said plurality of ports and an output destination;
   wherein said forwarding planes store scenario information including a relation calculated by said control plane between the port where the fault occurs and a transfer port;
   wherein said forwarding planes update said routing table based upon said scenario information when it is detected that a fault occurs in communication with a destination connected to said port; and
   wherein said scenario information stored by each of said plurality of forwarding planes is respectively different.

* * * * *